May 1, 1956
J. A. KLOD
2,743,751
BEARING STRUCTURE FOR THE SHAFT OF A FEED
SCREW OF A MEAT GRINDING MACHINE
Filed June 16, 1953
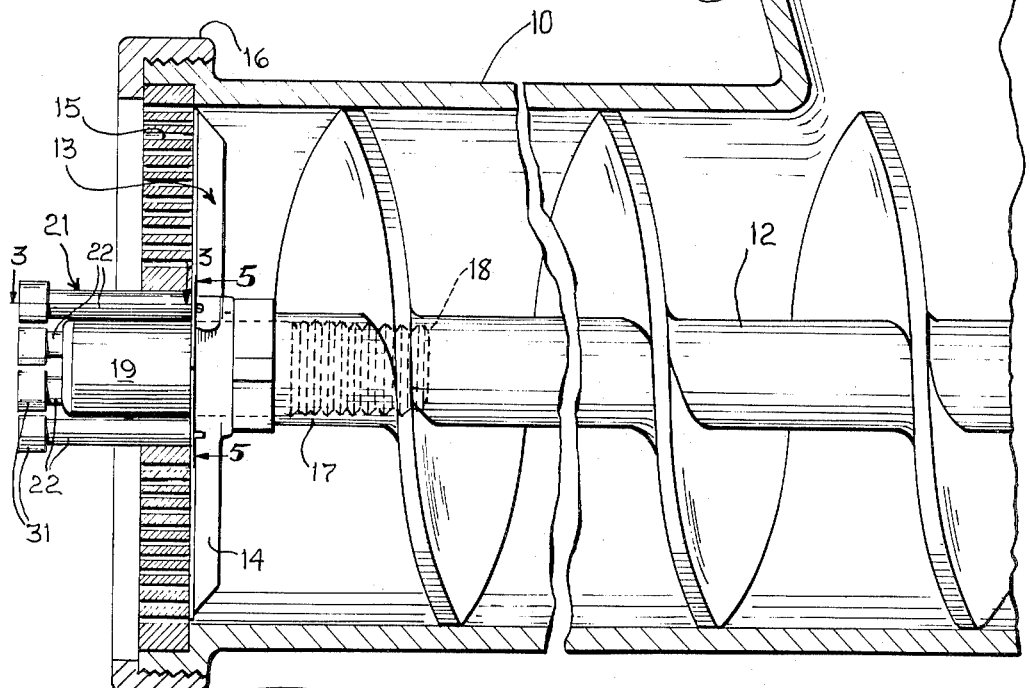
Fig. 1.
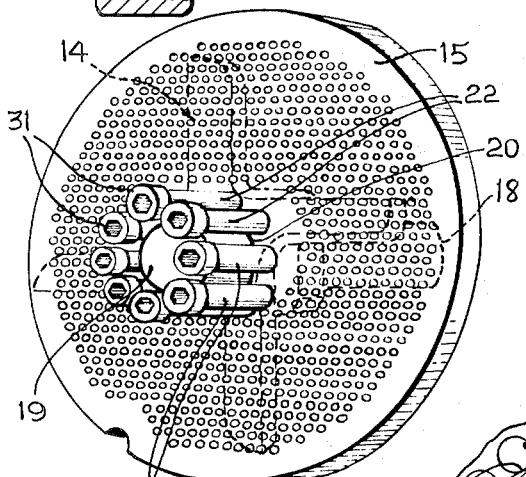
Fig. 2.
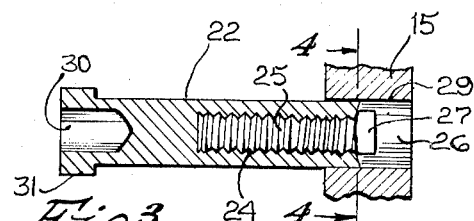
Fig. 3.
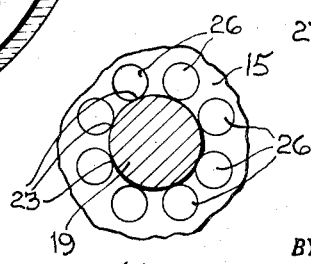
Fig. 4.
Fig. 5.
INVENTOR.
John A. Klod
BY Clarence E. Threedy
HIS ATTORNEY.

United States Patent Office

2,743,751
Patented May 1, 1956

2,743,751

BEARING STRUCTURE FOR THE SHAFT OF A FEED SCREW OF A MEAT GRINDING MACHINE

John A. Klod, Chicago, Ill.

Application June 16, 1953, Serial No. 362,074

3 Claims. (Cl. 146—182)

My invention relates to a bearing structure for the shaft of a feed screw of a meat grinding machine and has for its principal object the provision of an improved construction of this character which will be highly efficient in use and economical in manufacture.

While my invention is especially designed for incorporation in meat grinders generally employed by packing houses, meat processing companies and butcher shops, it may be incorporated in a domestic or household meat grinder.

It is the present and common practice to provide a bearing of solid construction for the end of the feed screw of the meat grinding apparatus which carries the cutter blade assembly. The type of bearing structure now commercially in use has many disadvantages, especially the bearing structure employed in meat grinders used by the packing houses and meat packing companies and butcher shops. Among these disadvantages is the heating of the shaft due to its long, continuous and uninterrupted rotation. The heat from this shaft is transmitted to the bearing and adjacent structure of the meat grinder with the result that particles of meat which are permitted to remain in close contact with the heated shaft or heated adjacent parts of the grinder eventually become spoiled. Should these spoiled meat particles become dislodged from the heated shaft or other portions of the meat grinder during the grinding operation, the same becomes a part of the ground meat and may eventually contaminate the entire mass of ground meat. On the other hand, unless these spoiled particles are removed at the end of each grinding operation, an offensive odor is produced. It is therefore one of the objects of my invention to produce a bearing structure which will have a minimum of bearing engagement with the shaft and one which is substantially in the form of a bearing cage permitting circulation of air therethrough and into contact and over the surfaces of the feed screw shaft.

Another object of the invention is to provide such a bearing cage which can be easily and thoroughly washed and cleaned and one which permits accessability to any particles adhered to the bearing cage or feed screw shaft.

Other objects will appear hereinafter.

The invention consists in the novel combination and arrangement of parts to be hereinafter described and claimed.

The invention will be best understood by reference to the accompanying drawings showing the preferred form of construction and in which:

Fig. 1 is a longitudinal fragmentary sectional detail view depicting a conventional meat grinder having incorporated therein my invention;

Fig. 2 is a perspective view of the perforated plate of the meat grinder showing my improved bearing cage associated therewith;

Fig. 3 is an enlarged sectional detail view taken substantially on line 3—3 of Fig. 1;

Fig. 4 is a fragmentary sectional detail view taken substantially on line 4—4 of Fig. 3; and Fig. 5 is a sectional detail view taken substantially on line 5—5 of Fig. 1.

It is contemplated that the several objects of my invention be accomplished by the preferred form of construction shown in the accompanying drawings. The conventional meat grinder includes a housing 10 having a funnel 11 through which meat to be ground is admitted into the housing 10. Arranged in the housing is a feed screw 12 for feeding the meat to be ground to the cutter blade assembly 13, the blades 14 of which rotate over the inner face of a perforated plate 15 secured to the housing by means of a cap screw 16.

In the present instance the feed screw 12 has threaded into one end 17 thereof the threaded end portion 18 of a shaft 19 on which the cutter assembly 13 is fixedly mounted.

My invention has to do with the bearing support for the shaft 19. In this connection the shaft 19 projects through an opening 20 formed in the plate 15. A bearing cage 21 surrounds the projected end portion of the shaft 19. This cage 21 comprises a plurality of elongated studs 22 arranged concentrically about the shaft 19 with inner surfaces 23 in bearing engagement with the shaft 19. These studs are arranged in spaced relation with respect to each other and are individually detachably connected to the plate 15. In the preferred form of construction for connecting these studs 22 to the plate 15, each stud is provided with a threaded bore 24 into which the threaded shank 25 of a nut 26 is threaded. This nut 26 provides opposite notches 27 into which project ribs 28 of the plate 15. The ribs 28 project into an opening 29 formed in the plate 15. When the shank 25 is properly threaded into the threaded bore 24, the elongated studs 22 will be drawn against the ribs 28 and be firmly connected to the plate 15.

To facilitate the rotation of the elongated studs 22, I provide a tool receiving socket 30 in a head portion 31 provided by the stud 22.

From the above description, it is apparent that a substantially open cage is provided as a bearing support for the shaft 19. As the elongated studs 22 are spaced from each other a minimum bearing surface between the studs and the shaft will be provided. This reduction of bearing surface coupled with the fact that air can circulate through the cage over and around the shaft 19, reduces heating of the shaft to a minimum, thus overcoming the several present-day objections to the bearing supports for the shaft of a set screw of a meat grinding machine.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modification as come within the scope of the appended claims.

Having thus described my invention, what I claim as new and desire to protect by Letters Patent is:

1. A bearing structure for the shaft of a feed screw of a meat grinder having a perforated plate through which ground meat is forced by said feed screw and through an opening of which said shaft projects comprising a bearing cage for said shaft providing elongated elements carried by and extending from said plate and embracing said shaft and disposed in spaced relation with respect to each other and each providing a bearing surface for said shaft.

2. A bearing structure for the shaft of a feed screw of a meat grinder having a perforated plate through which ground meat is forced by said feed screw and through an opening of which said shaft projects comprising a bearing cage for said shaft providing elongated elements carried by and extending from said plate and embracing said shaft and disposed in spaced relation with respect to each other and each providing a bearing surface for said shaft, and means for independently detachably connecting each of said elements to said plate.

3. A bearing structure for the shaft of a feed screw of a meat grinder having a perforated plate through which ground meat is forced by said feed screw and through an opening of which said shaft projects comprising a bearing cage for said shaft providing elongated elements carried by and extending from said plate and embracing said shaft and disposed in spaced relation with respect to each other and each providing a bearing surface for said shaft, and means for independently detachably connecting each of said elements to said plate, each of said elements extending beyond the end of said shaft and provided with an enlarged head for the reception of a tool to facilitate removing the elements from said plate.

References Cited in the file of this patent

UNITED STATES PATENTS

| | | |
|---|---|---|
| 1,987,172 | Ward | Jan. 8, 1935 |
| 2,199,030 | Ritter et al. | Apr. 30, 1940 |
| 2,265,065 | Daywalt et al. | Dec. 2, 1941 |
| 2,645,078 | Bulova | July 14, 1953 |

FOREIGN PATENTS

| | | |
|---|---|---|
| 504,527 | Belgium | July 31, 1951 |